Nov. 19, 1968 F. R. PRESTON 3,412,264
CONTROLLED THRESHOLD VOLTAGE TRIGGERING DEVICE
Filed May 28, 1965 2 Sheets-Sheet 1

INVENTOR.
FRANCIS R. PRESTON
BY Herbert L. Davis
ATTORNEY

INVENTOR.
FRANCIS R. PRESTON
BY Herbert L. Davis
ATTORNEY

United States Patent Office
3,412,264
Patented Nov. 19, 1968

3,412,264
CONTROLLED THRESHOLD VOLTAGE TRIGGERING DEVICE

Francis R. Preston, Wayne Township, Passaic County, N.J., assignor to The Bendix Corporation, Teterboro, N.J., a corporation of Delaware Filed May 28, 1965, Ser. No. 459,572
7 Claims. (Cl. 307—235)

ABSTRACT OF THE DISCLOSURE

Apparatus for controlling the threshold voltage of a triggering circuit and for rendering said circuit effective for providing logic outputs. A control means is responsive to a control voltage input for affecting the device so that the output therefrom is proportional to the control voltage input.

This invention relates to a controlled threshold voltage triggering device and more particularly to means for controlling the threshold voltage of triggering circuits.

Essentially, transistorized triggering circuits operate on the principle that in the quiescent state the circuit will remain stable with one transistor conducting and the other transistor cut-off. When a voltage of a preselected magnitude is applied to the cut-off transistor it will be rendered conductive thus causing the other transistor to be cut-off. Such a device may be a Schmitt trigger which will be further described in detail with reference to the figures included herein. A logic output may thus be obtained from the triggering device by applying a voltage at which the conductive action of the transistors therein may be reversed. This voltage is known as the threshold voltage.

On certain occasions it may be necessary that the threshold voltage be a function of one of the input voltages.

When, for example, a comparator is used in a system to compare two voltages, it may be desirable that the threshold voltage be a function of one of the voltages to be compared. In such a situation, the voltage to be compared will be coupled as an input to the comparator, and will also be coupled to the triggering device in a manner such a described in the present invention in order to control the threshold voltage thereof. It may be seen that such a device has many practical applications, particularly where it is essential that the threshold voltage be related to a preselected voltage as heretofore noted.

It is an object of this invention to provide means for controlling the threshold voltage of a triggering circuit.

It is another object of this invention to control the threshold voltage of a triggering circuit utilized in a system by employing an input voltage to the system.

It is another object of this invention to provide a triggering device having a threshold voltage which is a function of a control voltage applied to the device.

It is another object of this invention to utilize a preselected voltage to control the threshold voltage of a triggering device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In reference to the drawings, corresponding parts have been indicated by corresponding numerals:

Figures 1, 2:
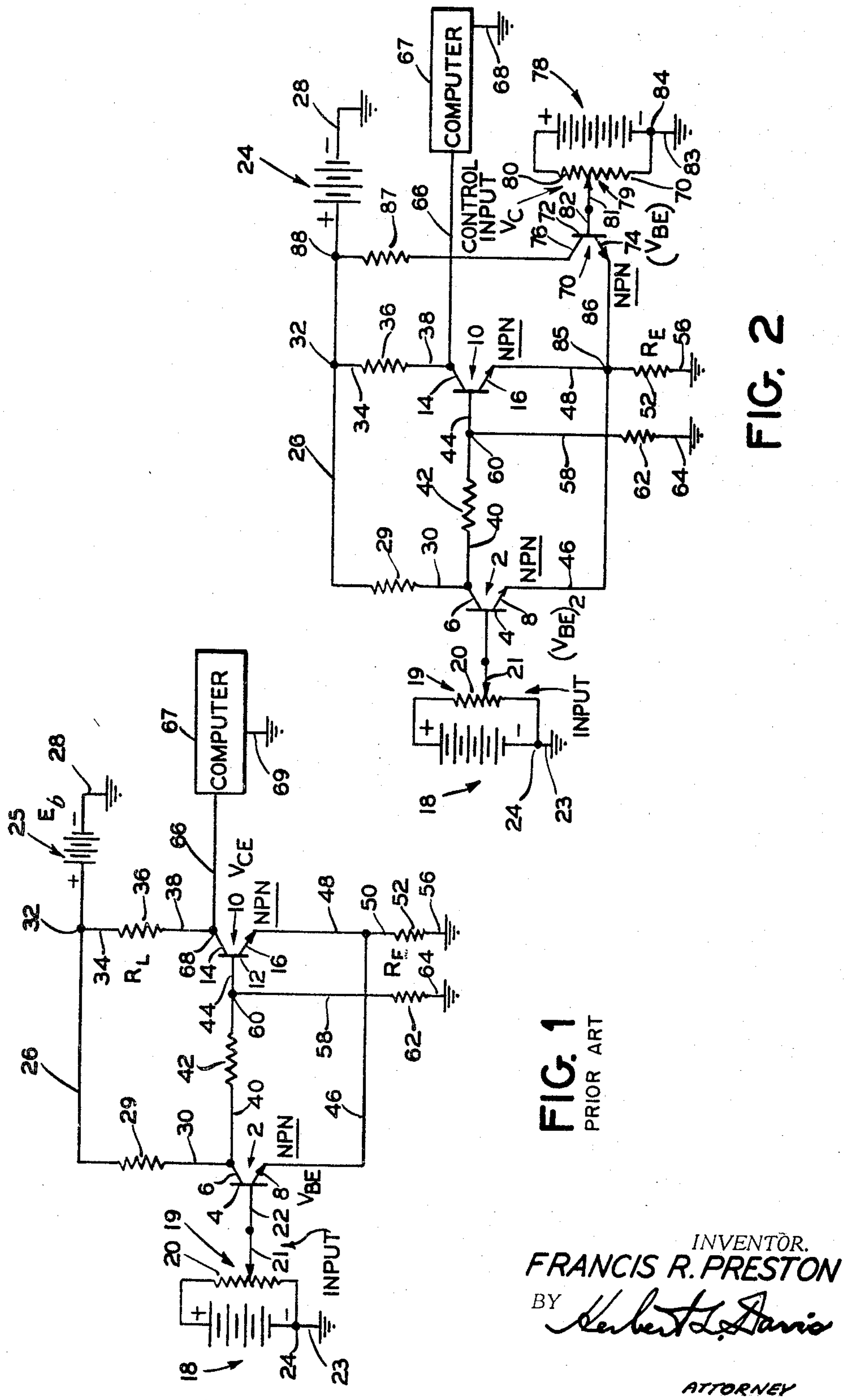
FIG. 1 PRIOR ART, FIG. 2
FIGURE 1 is an electrical schematic diagram showing a conventional Schmitt triggering device.
FIGURE 2 is an electrical schematic diagram illustrating the present invention as applied to the triggering device shown in FIGURE 1 and so arranged that the threshold voltage of the triggering device may be controlled by a control voltage.

In reference then to FIGURE 1, a conventional solid state Schmitt triggering device is shown. Although this device is of a conventional type, the operation thereof will be explained so that the novel means for controlling the threshold voltage embodied in the present invention may be more fully understood.

The Schmitt triggering device of FIGURE 1 includes an NPN type transistor 2 having a base 4, a collector 6 and an emitter 8, and an NPN type transistor 10 having a base 12, a collector 14 and an emitter 16. An input voltage is supplied to the device by a direct current source or battery 18 which is made variable by an operator-operable potentiometer 19 having a resistor 20 connected at one end to the positive terminal of the battery 18 and an opposite end connected to the negative terminal of the battery 18. An operator-operable arm 21 of the potentiometer 19 is connected by a conductor 22 to the base 4 of the transistor 2. The negative terminal of the direct current source or battery 18 is connected to ground through a conductor 23 with the resistor 20 joining the grounded conductor 23 at a point 24. The transistors 2 and 10 are biased by another direct current source or battery 25 having a positive terminal connected to the collectors 6 and 14 of the transistors 2 and 10, respectively, through a conductor 26, and a negative terminal connected to ground through a conductor 28.

The conductor 26 is connected from a positive terminal of the direct current source or battery 24 to the collector 6 of the transistor 2 through a load resistor 29 and a conductor 30. The collector 14 of the transistor 10 is connected to the conductor 26 at a point 32 through a conductor 34, a load resistor 36 and a conductor 38. The collector 6 of the transistor 2 is connected to the base 12 of the transistor 10 through a conductor 40, a resistor 42 and another conductor 44. The emitter 8 of the transistor 2 and the emitter 16 of the transistor 10 are coupled through conductors 46 and 48 respectively, and a conductor 50, to a common resistor 52. The resistor 52 is grounded through a conductor 56.

A conductor 58 joins the conductor 44 leading from the resistor 42 to the base 12 of a transistor 10 at a point 60. The conductor 58 is further connected through a resistor 62 and a conductor 64 to ground. The output of the triggering device is taken at the collector 14 of the transistor 10 by an output conductor 66 joining the collector 14 of the transistor 10 at a point 68.

When the Schmitt trigger shown in FIGURE 1 is in the quiescent state, that is the potentiometer arm 21 is so adjusted by the operator that no input voltage is applied to the transistor 2 from the direct current source 18, the transistor 10 of the Schmitt trigger will be saturated, and hence be conductive. In order for this condition to be reversed, that is, for the transistor 10 to be rendered cut-off and the transistor 2 rendered conductive, the potentiometer arm 21 is so readjusted by the operator that the signal voltage applied to the transistor 2 from the direct current source 18 must exceed a predetermined level. As heretofore noted, this voltage is designated as the threshold voltage and made variable through the operator-operable potentiometer 19.

The magnitude of the threshold voltage may be determined by assuming that the transistor 10 is saturated and that the voltage $V_{CE}$ across the collector 14 and the emitter 16 of the transistor 10 is much smaller than the biasing voltage $E_b$ provided by the direct current source or battery 25 and hence can be neglected. With the voltage across the resistor 52 symbolically represented by $R_E$, the voltage across the resistor 52 which is connected to the emitter 8 of the transistor 2 and the emitter 16 of the transistor 10, may be developed by the Ohm's Law relation and designated by the expression;

$$V_{R_E}=\frac{E_b R_E}{R_E+R_L} \quad (1)$$

where $R_L$ represents the magnitude of the load resistor 36. The threshold voltage, therefore, may be expressed as the voltage across $R_E$ plus the voltage across the base 4 and the emitter 8 of the transistor 2 designated as $V_{BE}$.

$$V_{\text{Threshold}}=\frac{E_b R_E}{R_E+R_L}+(V_{BE}) \quad (2)$$

When the input from the direct current source or battery 18 exceeds the voltage as expressed in Equation 2, transistor 2 will be rendered conductive causing transistor 10 to be rendered cut off. A logic output will thus be obtained at the conductor 66 of the triggering device, shown in FIGURE 1, which may be coupled to a device such as a computer 67 through the output conductor 66 and a grounded conductor 69.

With the operation of the Schmitt trigger explained in this manner, the novel means embodied in the present invention to control the threshold voltage may be next explained with reference to FIGURE 2. The circuit shown in FIGURE 2 includes a Schmitt trigger identical to that in FIGURE 1, wherein like components are designated by like numerals including transistor 2 which, in the quiescent state, is cut off and the transistor 10 which, in the quiescent state, is conductive. In addition, FIGURE 2 shows the necessary circuitry to control the threshold voltage as will be now explained.

Shown in FIGURE 2 is an NPN type control transistor 70 having a base 72, an emitter 74 and a collector 76. A control voltage $V_C$ is supplied by a direct current source or battery 78 which is made variable by an operator-operable potentiometer 79 having a resistor 80 connected across the positive and negative terminals of the battery 78 and an arm 81 connected through a conductor 82 to the base 72 of the transistor 70. A negative terminal of the direct current source or battery 78 is connected to ground through a conductor 83 with the resistor 80 joining the grounded conductor 83 at point 84. The emitter 74 of the transistor 70 joins the common emitter resistor 52 at a point 85 through a conductor 86. The collector 76 of the transistor 70 is connected through a resistor 87 to a point 88 on the conductor 26 leading from the positive terminal of the biasing source 24.

In the absence of an input from the direct current source 78 through appropriate adjustment of the operator-operable potentiometer 79, the transistor 70 will be cut off and the circuit in FIGURE 2 will perform as an ordinary Schmitt trigger as described for the circuit in FIGURE 1. In the presence, however, of an input from the direct current source 78, effected by appropriate adjustment of the potentiometer arm 81 by the operator, the voltage across the common emitter resistor 52, symbolically represented as $R_E$, which is coupled to the emitter 8 of the transistor 2, the emitter 16 of the transistor 10 and the emitter 74 of the transistor 70 to ground, will increase. Under these conditions, the threshold voltage provided by the direct current source 18 may be increased by the potentiometer 19 being appropriately adjusted by the operator as indicated by the relationship shown in FIGURE 2. This threshold voltage may be related to the control voltage $C_C$ applied to the transistor 70 by the direct current source 78, the base to emitter voltages $$(V_{BE})_{70}$$

of the transistor 70, and the base to emitter voltage $$(V_{BE})_2$$

of the transistor 2 as follows:

$$V_{\text{Threshold}}=(V)_C-(V_{BE})_{70}+(V_{BE})_2 \quad (3)$$

It can thus be seen that the threshold voltage is a function of the control voltage $V_C$ applied by the direct current source 78, and can thus be raised by any desired factor relative to the initial threshold voltage for any ordinary Schmitt trigger.

Figure 3:
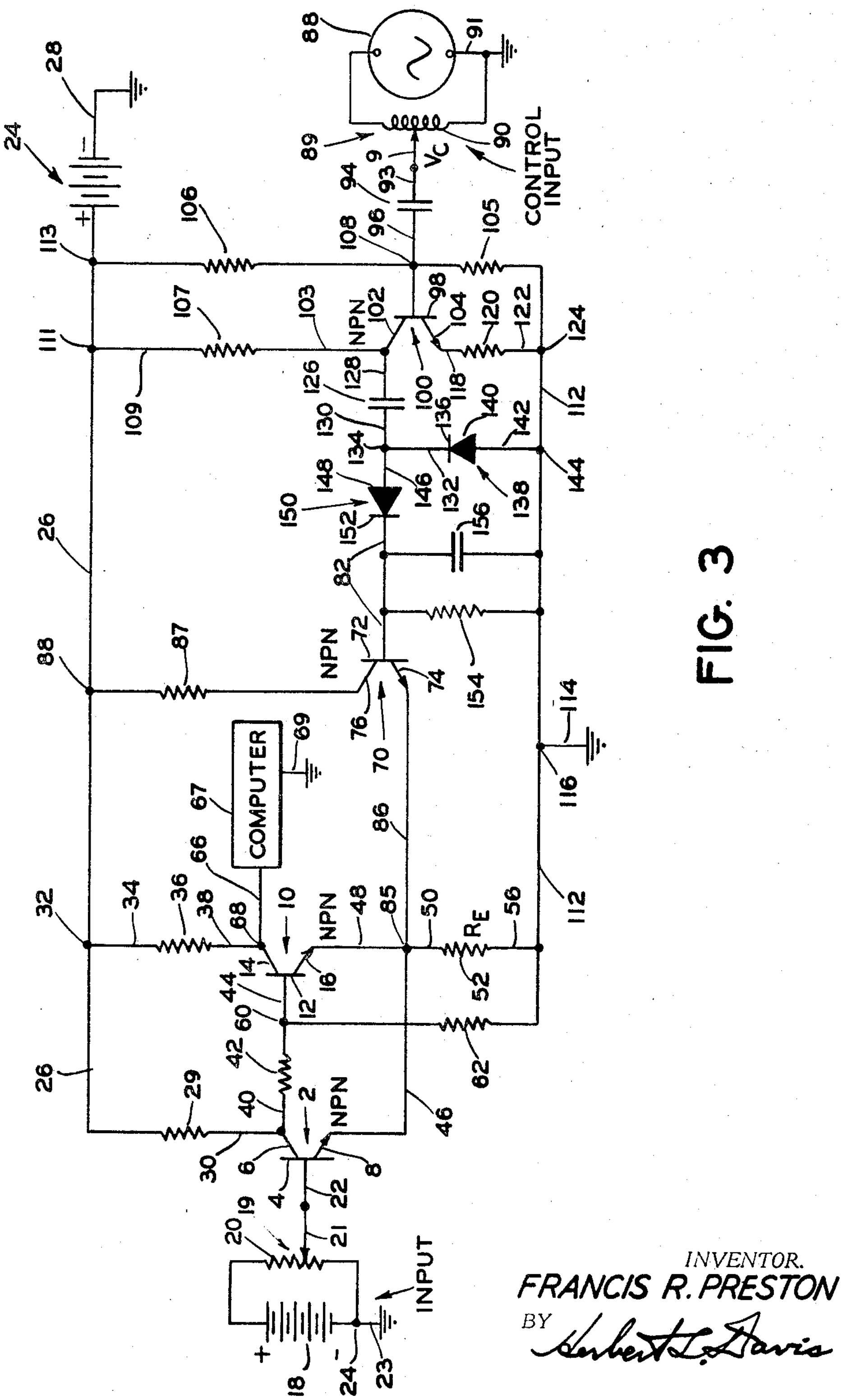
FIGURE 3 is an electrical schematic diagram of a device embodying the present invention and showing a typical application of the controlled threshold voltage triggering device shown in FIGURE 2.

The circuit in FIGURE 3 is an example of how the means for controlling the threshold voltage embodied in the present invention may be applied generally in a system. FIGURE 3 includes the circuitry shown in FIGURES 1 and 2 wherein like components are designated by like numerals, and also includes appropriate circuitry to develop a control voltage $V_C$ as shown in FIGURE 2 and the description thereof. It may be desired, for example, to relate the threshold voltage of a triggering circuit included in a system to an alternating current voltage source, which may also be the input to a comparator as heretofore discussed. The input voltage is supplied by an alternating current source 88 which is made variable by an operator-operable adjustable auto transformer 89 of conventional type having a coil 90 connected at one end to a terminal of the alternating current source 88 and an opposite end connected to a conductor 91 which couples the alternating current source 88 to ground. An operator-operable arm 92 of the adjustable auto transformer 89 is connected by a conductor 93 to a capacitor 94 with the output of the capacitor 94 coupled through a conductor 96 to a base 98 of NPN type amplifying transistor 100. The transistor 100 has a collector 102 and an emitter 104. Intermediate the capacitor 94 and the transistor 100, resistors 105 and 106 join the conductor 96 at the point 108. The resistor 105 is connected to a conductor 112 which is coupled to a common ground by a conductor 114 joining the conductor 112 at a point 116. The resistor 106 is coupled at a point 113 to a conductor 26 which leads to the direct current source 24 acting to bias the circuit.

The collector 102 of the transistor 100 is coupled to the conductor 26 by a conductor 103, a resistor 101 and a conductor 109 joining the conductor 26 at a point 111. The emitter 104 of the transistor 100 is coupled to the common ground by a conductor 118, a resistor 120 and a conductor 122 joining the conductor 112 at a point 124.

The collector 102 of the transistor 100 is further connected to the input plate of a capacitor 126 through a conductor 128. The output plate of the capacitor 126 is joined through a conductor 130 to a conductor 132 joining the conductor 130 at a point 134. The conductor 132 leads to a cathode 136 of a diode 138 with the anode 140 of the diode 138 connected to the common ground by a conductor 142 joining the conductor 112 at a point 144.

A conductor 146 leading to the anode 148 of a diode 150 is also joined to the output plate of the capacitor 126 at the point 134. The cathode 152 of the diode 150 is joined to the base 72 of the transistor 70 shown in FIGURE 3 through the conductor 82 also shown in FIGURE 2. A resistor 154 and a capacitor 156 are connected across the conductor 82 and the conductor 112 joining the grounded conductor 114 at the point 116.

The aforenoted circuitry described with reference to FIGURE 3 is a rectifying means which converts the alternating current input provided by the alternating current source 88 through the operator-operative adjustable auto transformer 89 to a direct current input which may be supplied as a control voltage to the transistor 70. This control voltage $V_C$ which may be set by the adjustment of the operator-operative auto transformer 89 may be utilized to control the magnitude of the threshold voltage of the triggering device embodied in the present invention and as described with reference to FIGURE 2. When the the arm 92 of the adjustable auto transformer 89 is so adjusted by the operator that no input voltage is supplied from the alternating current source 88, the transistor 70 is cut off since it receives no input, and the circuit is reduced to a conventional Schmitt trigger as described with reference to FIGURE 1. When the arm 92 of the variable auto transformer 89 is so readjusted by the operator that a voltage is supplied by the alternating current source 88, the rectifying circuitry described with reference to FIGURE 3 will convert this alternating current supply to a direct current control voltage. This direct current control voltage will appear at the emitter 74 of the transistor 70 thus causing a voltage across the common emitter resistor 52, symbolically represented as $R_E$ as heretofore described, and causing a resulting increase in the required threshold voltage as indicated by Equations 2 and 3. The potentiometer arm 21 may be readjusted to accommodate this increase in threshold voltage so as to trigger the switching action as heretofore described.

In summation, the present invention provides a simple, direct means to raise the threshold voltage of a triggering device such as a Schmitt trigger. The utility of providing a means for so raising the aforenoted threshold voltage is evident when it is considered that certain circuitry, such as that involved in a variable gain comparator, may require that the threshold voltage of a triggering device be a funtcion of one of the input voltages to the comparator, or some other predetermined voltage.

With the conventional type of Schmitt trigger shown in FIGURE 1, the addition of a control transistor 70 shown in FIGURE 2 to receive a predetermined direct current control input provides the variable threshold characteristic of the present invention. The control input provided to the circuit as shown and described in FIGURE 2, increases the voltage at the emitter 74 of the transistor 70 with the emitter 74 being coupled to the common emitter resistor ($R_E$) 52, and, hence, cause the threshold voltage to rise. With an increase in voltage across resistor 52, provided by adjusting potentiometer arm 19, the resulting increase in threshold voltage may be accomplished by adjusting potentiometer arm 21.

The circuitry in FIGURE 3 shows a typical application of the novel controlled threshold voltage triggering device embodied in the present invention when employed in a system. The input to the system may well come from an alternating current source which is made variable by the auto-transformer 79.

Prior to being directed to the control transistor 70, the alternating current input must first be rectified by the circuitry as shown in FIGURE 3. With this accomplished, the rectified signal may be directed to the control transistor 70 so as to control the threshold voltage of the triggeering device as heretofore described.

While two embodiments of the invention have been illustrated and described in detail, it is to be expressly understood thath the invention is not limited thereto. Various changes may also be made in the design and arrangement of the parts without departing from the spirit and scope of the invention as the same will now be understood by those skilled in the art.

What is claimed is:

1. A triggering device comprising circuit means for providing a logic output including means for providing an input voltage, means for varying said input voltage, first and second semi-conductors each being rendered alternately conductive and non-conductive by varying said input voltage relative to a threshold voltage, a common resistor operably connected to said first and second semi-conductors, said threshold voltage being controlled by the voltage across said resistor, means for providing a control voltage, means for varying said control voltage, a third semi-conductor responsive to said control voltage and operatively connected to said resistor so as to vary the voltage across said resistor in response to said control voltage and thereby the threshold voltage, and said first and second transistors responsive to the relationship of said input voltage above and below said threshold voltage to provide a logic output.

2. A triggering device for providing a logic output comprising first and second NPN type transistors each having base, collector and emitter elements, means for biasing the collector elements, means for connecting the emitter elements to a common resistor, means for providing an input voltage, means for connecting the input voltage to the base element of the first transistor, means for connecting the collector element of said first transistor to the base element of the second transistor, means rendering said second transistor conductive and said first transistor cut-off in the quiescent state, means for varying said input voltage, said input voltage being increased beyond a predetermined threshold voltage to render said first transistor conductive and said second transistor cut off, said threshold voltage dependent upon the voltage across the common resistor, a third transistor having base, collector and emitter elements, means for biasing the collector element of the third transistor, means for providing a control voltage, means for connecting the base element to the control voltage, means for connecting the emitter element to said common resistor, means for varying said control voltage, said threshold voltage varying with said control voltage, and said input voltage being varied relative to said threshold voltage rendering said first and second transistors conductive and non-conductive causing said triggering device to provide a logic output.

3. A triggering device for providing a logic output comprising first and second transistors, means for biasing the transistors, means for connecting the transistors to a common resistor, means for providing an input voltage, means for connecting the first transistor to the input voltage, means rendering said second transistor conductive and said first transistor cut off in the quiescent state, means for varying said input voltage, said first transistor becoming conductive rendering said second transistor cut off when said input voltage is increased to exceed a predetermined threshold voltage, the threshold voltage being dependent upon the voltage across the common resistor, a third transistor means for providing a control voltage, means for connecting the third transistor to the control voltage, means for connecting said third transistor to said common resistor, means for varying said control voltage causing said threshold voltage to vary, and said input voltage being varied relative to said threshold to the level of said control voltage, and said voltage rendering said first and second transistors alternately conductive and nonductive causing said triggering device to provide a logic output.

4. A triggering device for providing a logic output comprising first and second transistors each having emitter elements connected to a common resistor, means for providing an input voltage, means for connecting the first transistor to the input voltage, means for rendering said second transistor conductive and said first transistor cut off when said input voltage is below a predetermined threshold voltage, said first transistor becoming conductive rendering said second transistor cut off when the input voltage is increased to exceed the predetermined threshold voltage, said threshold voltage being controlled by the voltage across said common resistor, a third transistor having an emitter element connected to said common resistor, means for providing a control voltage, means for connecting the third transistor to the control voltage, means for varying the control voltage, said threshold voltage varying with said control voltage, said input voltage being varied relative to said threshold voltage, and said first and second transistors responsive to said varying input voltage to provide a logic output.

5. A triggering device for providing a logic output comprising first, second and third transistors each having base, collector and emitter elements, means for connecting the emitter elements to a common resistor, means for biasing the collector elements, means for providing an input voltage, means for connecting the base element of the first transistor to the input voltage, means for providing a control voltage, means for connecting the base element of the third transistor to the control voltage, means for connecting said first and second transistors so that in the quiescent state said second transistor is conductive rendering said first transistor cut off, means for varying said input voltage, said first transistor becoming conductive rendering said second transistor cut off when said input voltage is varied to exceed a predetermined threshold voltage, said threshold voltage being controlled by the voltage across said common resistor, means for varying said control voltage, said voltage across said common resistor varying with said control voltage, said input voltage varied relative to said threshold voltage, and said first and second transistors being responsive to said varying input voltage to provide a logic output.

6. A triggering device for providing a logic output comprising first, second and third transistors, means for providing an input voltage, means for connecting said first transistor to the input voltage, means for providing a control voltage, means for connecting said third transistor to the control voltage, means for connecting said first, second and third transistors to a common resistor, means for varying said input voltage, means for rendering said second transistor conductive and said first transistor cut off when said input voltage varies below a predetermined threshold voltage, means for rendering said first transistor conductive and said second transistor cut off when said input voltage varies above said threshold voltage, said threshold voltage controlled by the voltage across said common resistor, means for varying said control voltage, said threshold voltage varying with said control voltage, said input voltage being varied with said threshold voltage, and said first and second transistors responsive to said input voltage to provide a logic output.

7. A triggering device comprising circuit means for providing a logic output, said circuit means including first and second transistors operably connected so that in the quiescent state said second transistor is conductive rendering said first transistor cut-off, said first and second transistors having emitter electrodes connected to a common resistor, means for providing an input voltage, means to vary the input voltage, said first transistor having a base electrode connected to the input voltage, said first transistor being rendered conductive and said second transistor rendered cut-off when the input voltage is varied to exceed a predetermined threshold voltage, said threshold voltage controlled by the voltage across said common resistor, means for providing a control voltage, means to vary the control voltage, a third transistor operably connected to said first and second transistors having an emitter electrode connected to said common resistor and a base electrode connected to the control voltage, said threshold voltage varying with said control voltage, said input voltage being varied with said threshold voltage, and said first and second transistors responsive to said input voltage to provide a logic output.

References Cited

UNITED STATES PATENTS

| | | | |
|---|---|---|---|
| 3,054,910 | 9/1962 | Bothwell | 307—290 |
| 3,109,944 | 11/1963 | Seestrom | 307—290 |
| 3,284,659 | 11/1966 | Outhouse | 307—290 |
| 3,299,296 | 1/1967 | Bullene | 307—290 |

JOHN S. HEYMAN, *Primary Examiner.*